US010924385B2

(12) United States Patent
Kumar

(10) Patent No.: US 10,924,385 B2
(45) Date of Patent: Feb. 16, 2021

(54) WEIGHTED MULTIPATH ROUTING CONFIGURATION IN SOFTWARE-DEFINED NETWORK (SDN) ENVIRONMENTS

(71) Applicant: NICIRA, INC., Palo Alto, CA (US)

(72) Inventor: Mohit Kumar, Pune (IN)

(73) Assignee: NICIRA, INC., Palo Alto, CA (US)

( * ) Notice: Subject to any disclaimer, the term of this patent is extended or adjusted under 35 U.S.C. 154(b) by 127 days.

(21) Appl. No.: 15/891,405

(22) Filed: Feb. 8, 2018

(65) Prior Publication Data

US 2019/0140937 A1 May 9, 2019

(30) Foreign Application Priority Data

Nov. 7, 2017 (IN) .............................. 201741039621

(51) Int. Cl.
*H04L 12/721* (2013.01)
*H04L 12/751* (2013.01)
*H04L 12/729* (2013.01)
*H04L 12/707* (2013.01)
*H04L 12/715* (2013.01)

(52) U.S. Cl.
CPC ............ *H04L 45/127* (2013.01); *H04L 45/02* (2013.01); *H04L 45/125* (2013.01); *H04L 45/24* (2013.01); *H04L 45/64* (2013.01)

(58) Field of Classification Search
CPC ....... H04L 45/127; H04L 45/02; H04L 45/24; H04L 45/125
See application file for complete search history.

(56) References Cited

U.S. PATENT DOCUMENTS

| | | | |
|---|---|---|---|
| 2010/0150024 A1* | 6/2010 | Juttner | H04L 45/02 370/254 |
| 2015/0124812 A1 | 5/2015 | Agarwal et al. | |
| 2016/0315912 A1* | 10/2016 | Mayya | H04L 12/4641 |
| 2016/0350683 A1* | 12/2016 | Bester | G06Q 10/0633 |
| 2017/0346727 A1* | 11/2017 | Perrett | H04L 45/126 |
| 2019/0104054 A1* | 4/2019 | McDonald | H04L 45/122 |
| 2019/0140956 A1* | 5/2019 | Shen | H04L 45/02 |

\* cited by examiner

*Primary Examiner* — Rebecca E Song
(74) *Attorney, Agent, or Firm* — Su IP Consulting

(57) ABSTRACT

Example methods are provided for a network management entity to perform weighted multipath routing configuration in a software-defined networking (SDN) environment. The method may comprise the network management entity obtaining state information associated with the multiple second nodes that provide multiple respective paths for first node to reach a destination network; and based on the state information associated with the multiple second nodes, assigning the multiple second nodes with respective multiple weights. The method may also comprise generating and sending control information specifying the multiple weights to the first node. The control information is to cause the first node to perform weighted multipath routing to distribute egress packets that are destined for the destination network over the multiple second nodes based on the multiple weights.

21 Claims, 8 Drawing Sheets

| Parameter | Example assignment | |
|---|---|---|
| weight_BW_i | BW_i/∑j BW_j x BW_factor | 520 |
| weight_RU_i | (1 - RU_i) x RU_factor | 530 |
| weight_PK_i | (1 - PK_i) x PK_factor | 540 |
| weight(nextHop_i) | f(weight_BW_i,weight_RU_i,weight_PK_i) = ROUND(weight_BW_i + weight_RU_i + weight_PK_i) | 550 |

WEIGHTED MULTIPATH ROUTING CONFIGURATION IN SOFTWARE-DEFINED NETWORK (SDN) ENVIRONMENTS

RELATED APPLICATIONS

Benefit is claimed under 35 U.S.C. 119(a)-(d) to Foreign Application Serial No. 201741039621 filed in India entitled "WEIGHTED MULTIPATH ROUTING CONFIGURATION IN SOFTWARE-DEFINED NETWORK (SDN) ENVIRONMENTS", on Nov. 7, 2017, by NICIRA, INC., which is herein incorporated in its entirety by reference for all purposes.

BACKGROUND

Unless otherwise indicated herein, the approaches described in this section are not admitted to be prior art by inclusion in this section.

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc.

Through SDN, benefits similar to server virtualization may be derived for networking services. For example, logical overlay networks that are decoupled from the underlying physical network infrastructure may be configured. Similar to a physical network, logical switches and logical routers may to provide respective layer-2 switching and layer-3 routing services to virtualized computing instances. To improve network efficiency, multiple paths may be configured in the SDN environment for one node to reach a particular destination network. Through multipath routing, one of the paths may be selected to send packets that are destined for the destination network. However, in practice, traffic may not be evenly distributed across the different paths, which may cause over-utilization of one path and under-utilization of another. This may in turn lead to network congestion and performance degradation.

DETAILED DESCRIPTION

Figure 1:
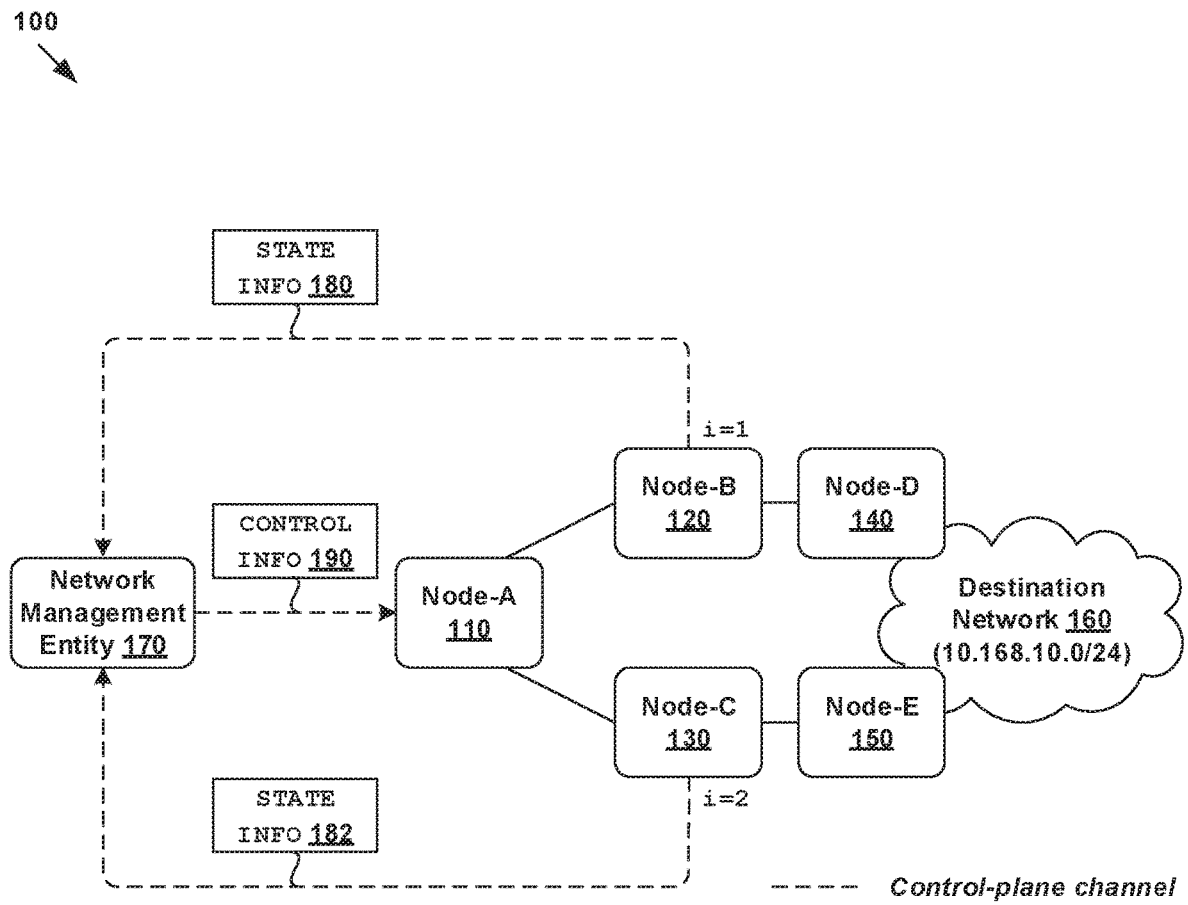
FIG. 1 is a schematic diagram illustrating a management plane view of an example SDN environment in which weighted multipath routing configuration may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 2:
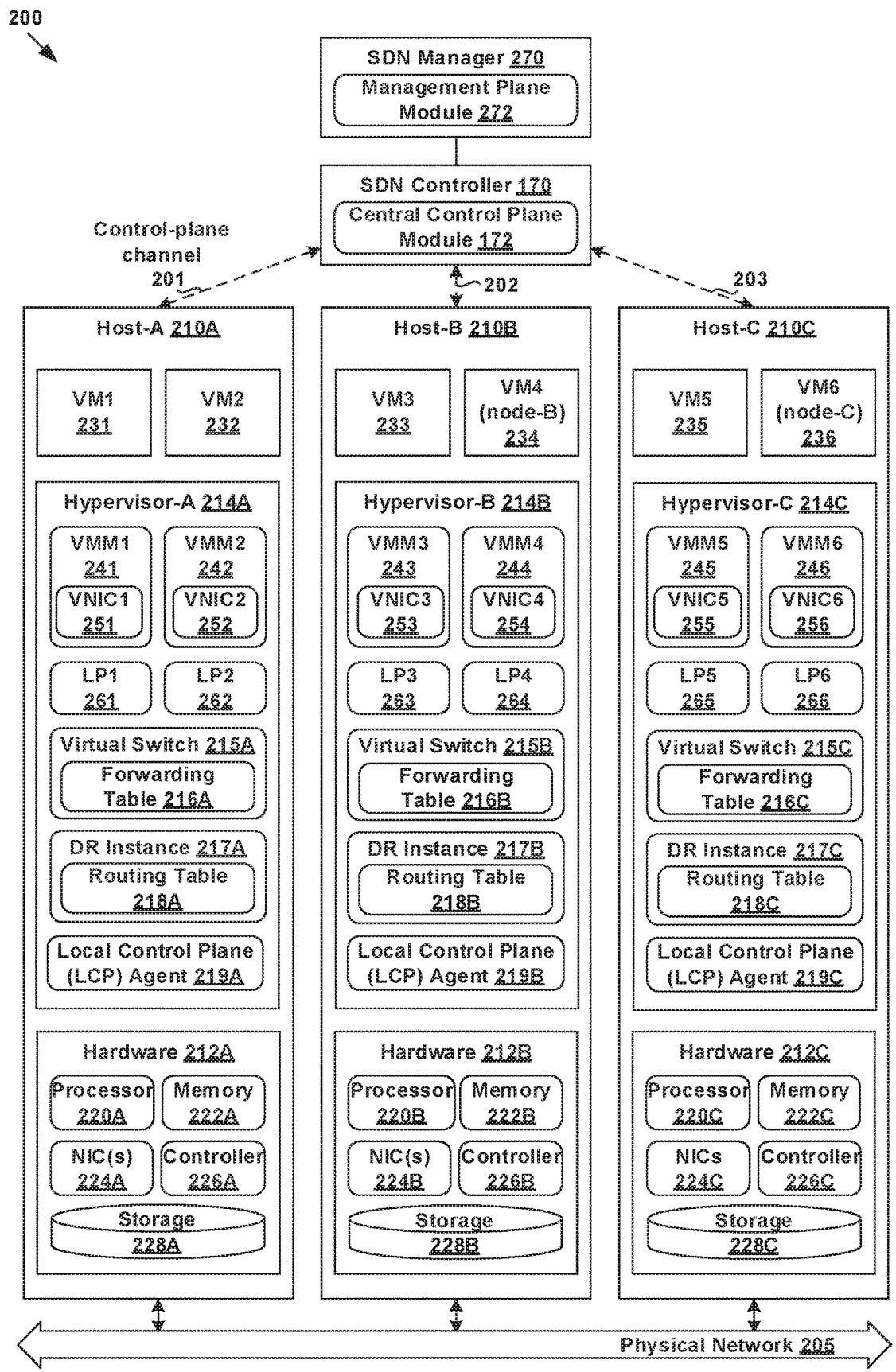
FIG. 2 is a schematic diagram illustrating a physical implementation view of the example SDN environment in FIG. 1.

Challenges relating to multipath routing will now be explained in more detail using FIG. 1 and FIG. 2, which represent two different views of the same software-defined networking (SDN) environment 100. FIG. 1 is a schematic diagram illustrating a management plane view of example SDN environment 100 in which weighted multipath routing configuration may be performed, and FIG. 2 is a schematic diagram illustrating physical implementation view 200 of example SDN environment 100 in FIG. 1. Depending on the desired implementation, SDN environment 100 may include additional and/or alternative component(s) than that shown in FIG. 1 and FIG. 2. As will be explained further below, the management plane view in FIG. 1 represents how various components are defined internally, whereas the physical implementation view in FIG. 2 represents a physical realization of those components.

In SDN environment 100, node-A 110 is connected to destination network 160 via multiple paths provided by respective node-B 120 and node-C 130. A first path is provided by node-B 120 and node-D 140, and a second path by node-C 130 and node-E 150. Node-B 120 and node-C 130 may also be referred to as the next-hop nodes of node-A 110. Destination network 160 (e.g., 10.168.10.0/24) may be a logical overlay network in SDN environment 100, or an external network. Although two alternative paths are shown in FIG. 1 for simplicity, the number of paths depends on the number of nodes and the topology of SDN environment 100.

In practice, nodes 110-150 may each represent a logical router or physical router. For example, node-A 110, node-B 120 and node-C 130 may be logical routers, such as logical distributed routers (DR), logical service routers (SR), or a combination of both. A DR represents a distributed routing component that is deployed to provide routing services for virtualized computing instances (e.g., virtual machines (VMs) in FIG. 2) to which the DR is connected. A DR may be implemented in a distributed manner in that it may span multiple hosts that support those virtualized computing instances. An SR represents a centralized routing component that is deployed to provide centralized stateful services, such as firewall protection, load balancing, network address translation (NAT), etc. Node-D 140 and node-E 150 may be logical routers (e.g., DR or SR) or physical routers.

Referring to physical implementation view 200 in FIG. 2, consider the case where node-A 110 is a DR, and node-B 120 and node-C 130 are SRs. In the example in FIG. 2, multiple hosts 210A-C (also known as a "computing devices", "host computers", "host devices", "physical servers", "server systems", "physical machines" etc.) are deployed to physically realize nodes 110-130 (or nodes 110-150) in FIG. 1. Hypervisor 214A/214B/214C maintains a mapping between underlying hardware 212A/212B/212C and virtual resources allocated to respective VMs.

Hardware 212A/212B/212C includes suitable physical components, such as processor(s) 220A/220B/220C; memory 222A/222B/222C; physical network interface controller(s) or NIC(s) 224A/224B/224C; and storage disk(s) 228A/228B/228C accessible via storage controller(s) 226A/226B/226C, etc. Virtual resources are allocated to each virtual machine to support a guest operating system (OS) and applications (not shown for simplicity). Corresponding to hardware 212A/212B/212C, the virtual resources may include virtual CPU, virtual memory, virtual disk, virtual network interface controller (VNIC), etc. Hardware resources may be emulated using virtual machine monitors (VMMs) 241-246, which may be considered as part of (or alternatively separated from) corresponding VMs 231-236. For example in FIG. 2, VNICs 251-256 are emulated by corresponding VMMs 241-246.

VMs 231-236 send and receive packets via respective logical ports 261-266. As used herein, the term "logical port" may refer generally to a port on a logical switch to which a virtualized computing instance is connected. A "logical switch" may refer generally to an SDN construct that is collectively implemented by virtual switches 215A-C of hosts 210A-C, whereas a "virtual switch" may refer generally to a software switch or software implementation of a physical switch. In practice, there is usually a one-to-one mapping between a logical port on a logical switch and a virtual port on a virtual switch. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Although examples of the present disclosure refer to virtual machines, it should be understood that a "virtual machine" running on a host is merely one example of a "virtualized computing instance." or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The virtual machines may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc. The term "layer-2" may refer generally to a Media Access Control (MAC) layer; and "layer-3" to a network or Internet Protocol (IP) layer in the Open System Interconnection (OSI) model, although the concepts described herein may be used with other networking models.

In the example in FIG. 2, node-A 110 may be a DR that is deployed to provide layer-3 logical distributed routing services to various virtual machines, such as VM1 231 and VM2 232 supported by host-A 210A, VM3 233 supported by host-B 210B and VM5 235 supported by host-C 210C. In this case, node-A 110 may be implemented in a distributed manner and can span multiple hosts 210A-C. For example, node-A 110 (i.e., DR) may be implemented collectively by DR instances 217A-C of respective hosts 210A-C and represented internally using routing tables 218A-C. Routing tables 218A-C may be include entries that collectively implement node-A 110.

Further in the example in FIG. 2, node-B 120 and node-C 130 may be SRs that are deployed to provide layer-3 logical centralized routing services. In this case, node-B 120 and node-C 130 may be implemented using VM4 234 and VM6 236, respectively. Node-A 110 may be connected with node-B 120, node-C 130 and virtual machines (e.g., VM1 231, VM2 232, VM3 233, VM5 235) via logical switches. Similar to DRs, logical switches may be implemented in a distributed manner and can span multiple hosts 210A-C. For example, logical switches may be implemented collectively by virtual switches 215A-C of respective hosts 210A-C and represented internally using forwarding tables 216A-C at the respective virtual switches 215A-C. Forwarding tables 216A-C may be each include entries that collectively implement the logical switches.

In practice, SDN environment 100 may have a two-tier topology that includes an upper tier associated with a provider logical router (PLR) and a lower tier associated with a tenant logical router (TLR). Each tier may include both DRs and SRs, or DRs and SRs on the upper tier but only DRs at the lower tier. The multi-tiered topology enables both the provider (e.g., data center owner) and tenant (e.g., data center tenant) to control their own services and policies. Each tenant generally has full control over its TLR policies, whereas common PLR policies may be applied to different tenants. As such, a logical router may be categorized as one of the following types: TLR-DR, TLR-SR, PLR-DR and PLR-SR. A provider generally has full control over PLR-SR and PLR-DR, while each tenant has full control over their own TLR-DR and/or TLR-SR.

In the case of a two-tier topology, node-A 110 in FIG. 1 may be a TLR-DR spanning hosts 210A-C, and node-B 120 and node-C 130 are TLR-SRs implemented using respective VM4 234 and VM6 236. In this case, node-D 140 and node-E 150 may be PLR-SRs. In another example, node-A 110 may be a TLR-SR (implemented using a virtual machine, not shown for simplicity) while node-B 120 and node-C 130 are PLR-SRs, each TLR-SR or PLR-SR being implemented using a virtual machine. In this case, node-D 140 and node-E 150 may be external routers. In practice, any other suitable approach may be used to implement an SR, such as Linux-based datapath development kit (DPDK) packet processing software, etc.

Further in FIG. 2, SDN controller 170 and SDN manager 270 are example network management entities that facilitate implementation of software-defined networks (e.g., logical overlay networks). One example of an SDN controller is the NSX controller component of VMware NSX® (available from VMware, Inc.) that operates on a central control plane.

SDN controller 170 may be a member of a controller cluster (not shown for simplicity) that is configurable using SDN manager 270 operating on a management plane. Network management entity 270/170 may be implemented using physical machine(s), virtual machine(s), or both.

Logical switches, logical routers, and logical overlay networks may be configured using SDN manager 270, SDN controller 170, etc. A logical overlay network may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts. Hosts 210A-C may maintain data-plane connectivity with each other via physical network 205 to facilitate communication among VMs 231-236.

SDN controller 170 is responsible for collecting and disseminating control information, such as logical network topology, membership information of logical networks, mobility of the members, protocol-to-hardware address mapping information of the members, firewall rules and policies, etc. To send and receive the control information, local control plane (LCP) agent 219A/219B/219C on host 210A/210B/210C communicates with SDN controller 170 via control-plane channel 201/202/203 (shown in dotted lines) over a management network. To provide the control-plane connectivity, a control-plane channel may be established between SDN controller 170 and host 210A/210B/210C using any suitable protocol, such as using Transmission Control Protocol (TCP) over Secure Sockets Layer (SSL), etc.

Referring to FIG. 1 again, node-A 110 may perform multipath routing to distribute traffic destined for destination network 160 over node-B 120 or node-C 130. Conventionally, equal cost multipath routing (ECMP) is commonly used as a mechanism to spread traffic across multiple paths with equal costs (e.g., equal number of hops). ECMP provides a simple, hash-based scheme to assign each packet flow to one of the available paths. However, in practice, ECMP may result in sub-optimal traffic distribution across the multiple paths, which may cause congestion and performance degradation in SDN environment 100.

Conventionally, weighted ECMP has also been proposed to address various shortcomings of ECMP. However, conventional weighted ECMP approaches necessitate code changes at nodes 110-130 to implement additional protocol(s) to allow inter-node information exchange, such as using Intermediate System-Intermediate System (IS-IS), Open Shortest Path First (OSPF), etc. Further, conventional ECMP and weighted ECMP approaches generally lack flexibility and programmability and do not provide users (e.g., network administrators) with much control over the selection of preferred path(s).

Weighted Multipath Routing Configuration

According to examples of the present disclosure, a control-plane approach for weighted multipath routing configuration may be implemented by a network management entity, such as SDN controller 170 that resides on a central control plane in SDN environment 100. Instead of necessitating nodes (e.g., node-A 110, node-B 120 and node-C 130) to implement additional protocol(s) for information exchange, SDN controller 170 may dynamically assign weights based on (e.g., real-time) state information from node-B 120 and node-C 130 and configure node-A 110 to perform weighted multipath routing based on the weights.

Figure 3:
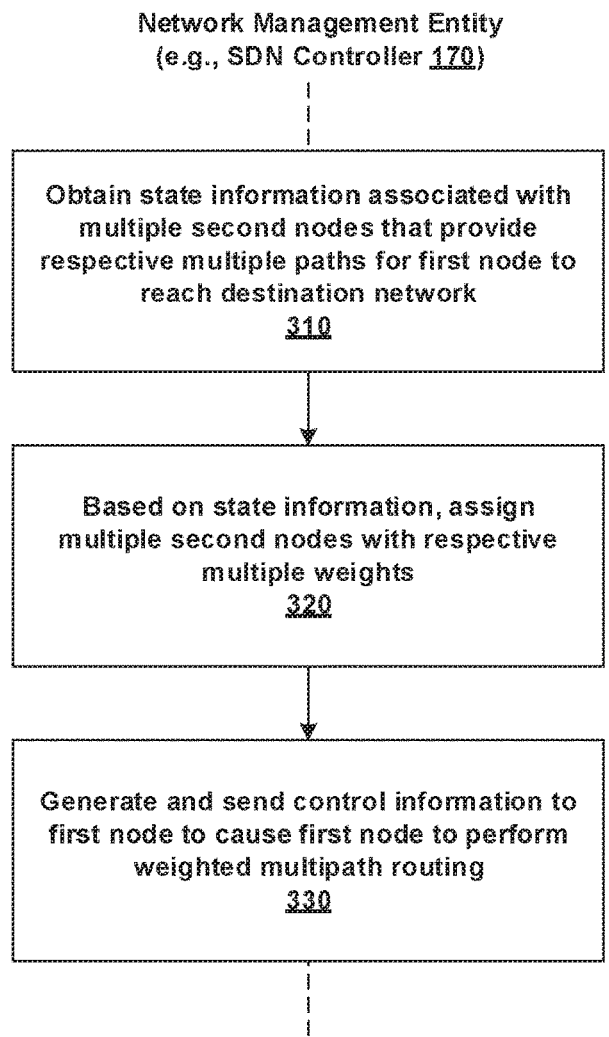
FIG. 3 is a flowchart of an example process for a network management entity to perform weighted multipath routing configuration in an SDN environment.

In more detail, FIG. 3 is a flowchart of example process 300 for a network management entity to perform weighted multipath routing configuration in SDN environment 100. Example process 300 may include one or more operations, functions, or actions illustrated by one or more blocks, such as 310 to 330. The various blocks may be combined into fewer blocks, divided into additional blocks, and/or eliminated depending on the desired implementation. Examples of the present disclosure may be implemented using any suitable "network management entity," such as SDN controller 170 (e.g., using central control plane module 172), SDN manager 270 (e.g., using management plane module 272), etc.

In the following, SDN controller 170 will be used as an example "network management entity," node-A 110 as an example "first node," node-B 120 and node-C 130 as example "multiple second nodes." The term "first node" may refer to any suitable logical router or physical router that is configurable by SDN controller 170 to perform weighted multipath routing according to examples of the present disclosure. The term "second nodes" (also known as "next-hop nodes") may refer to any suitable logical routers, physical routers, or a combination of both, that are capable of providing multiple paths for the first node to reach destination network 160. In practice, node-B 120 and node-C 130 will also be referred to as "next-hop nodes" that are directly or indirectly (e.g., via other intermediate switches/routers) connected with node-A 110.

At 310 in FIG. 3, SDN controller 170 obtains state information (see 180 and 182 in FIG. 1) associated with node-B 120 and node-C 130 that provide multiple respective paths for node-A 110 to reach destination network 160. At 320 in FIG. 3, based on state information 180/182, SDN controller 170 assigns node-B 120 and node-C 130 with respective multiple weights. At 330 in FIG. 3, SDN controller 170 generates and sends control information specifying the multiple weights (see 190 in FIG. 1) to node-A 110 to cause node-A 110 to perform weighted multipath routing to distribute egress packets that are destined for the destination network 160 over node-B 120 and node-C 130 based on the multiple weights.

For example in FIG. 1, control information 190 specifies weight(node-B)=3 assigned to node-B 120 (see 192), and weight(node-C)=4 assigned to node-C 130 (see 194). This way, node-A 110 may perform weighted multipath routing based on weights 192-194. In particular, in response to detecting an egress packet that is destined for destination network 160, control information 190 causes node-A 110 to select either node-B 120 or node-C 130 to be a next-hop node based on weight(node-B)=3 and weight(node-C)=4, and forward the egress packet via the next-hop node (e.g., node-C 130). The egress packet may originate from any suitable virtualized computing instance, such as VM1 231, VM2 232, VM3 233 or VM5 235 to which node-A 110 is connected in FIG. 2.

As will be discussed further using FIG. 4 and FIG. 5, state information 180/182 may be received at block 310 via control-plane channel 201/202/203 connecting SDN controller 170 with node-B 120 or node-C 130. State information 180/182 may include one or more of the following: bandwidth information associated with an egress interface of particular second node 120/130, resource utilization information associated with particular second node 120/130, packet performance information associated with the egress interface and routing information maintained by the particular second node. The weight assignment at block 320 may involve determining a first sub-weight associated with the bandwidth information, a second sub-weight associated with the resource utilization information, a third sub-weight associated with the packet performance information, or any combination thereof. In this case, a particular weight may be assigned to particular second node 120/130 based on the first sub-weight, second sub-weight, third sub-weight or a combination thereof.

As will be discussed further using FIG. 4 and FIG. 6A, control information 190 may cause node-A 110 to apply the set of weights 192-194 assigned at block 320 to egress packets belonging to new packet flows, without perturbing ongoing packet flows. Mapping information between ongoing flows, and a particular second node (e.g., node-B 120 or node-C 130) selected for the ongoing flow, may be stored in a multipath routing table maintained by node-A 110. However, in certain cases, node-A 110 may be instructed to remove all or a subset of entries in the multipath routing table to apply a new set of weights 192-194 to all or some of the ongoing flows.

In particular, as will be discussed further using FIG. 6B and FIG. 7, control information 190 may be generated to include an instruction to cause node-A 110 to update a multipath routing table maintained by node-A 110. The multipath routing table may include multiple entries that each associate (a) an ongoing flow of one or more egress packets with (b) one of second nodes 120-130 via which ongoing flow is being forwarded by node-A 110 to destination network 160. In one example, in response to detecting a first event based on state information 180-182, or weights 192-194, or both, the instruction may be generated to cause node-A 110 to remove all of the multiple entries from the multipath routing table. In another example, in response to detecting a second event based on state information 180-182, or weights 192-194, or both, the instruction may be generated to cause node-A 110 to remove a subset of the multiple entries from the multipath routing table.

To improve flexibility and programmability, SDN controller 170 may perform weight assignment at block 320 according to user-configurable parameters and/or computational approaches. Also, the "first event" (e.g., disruptive event in FIG. 7) and "second event" (e.g., high resource utilization in FIG. 6B) may be user-configurable to provide users with greater control over weighted multiple routing implementation at node-A 110. As will be described further below, examples of the present disclosure may rely on state information (e.g., bandwidth, resource utilization, packet performance) and user-defined events to assign weights to next-hop nodes in weighted multipath routing configurations. In the following, various examples will be discussed using FIG. 4 to FIG. 8.

State Information

Figure 4:
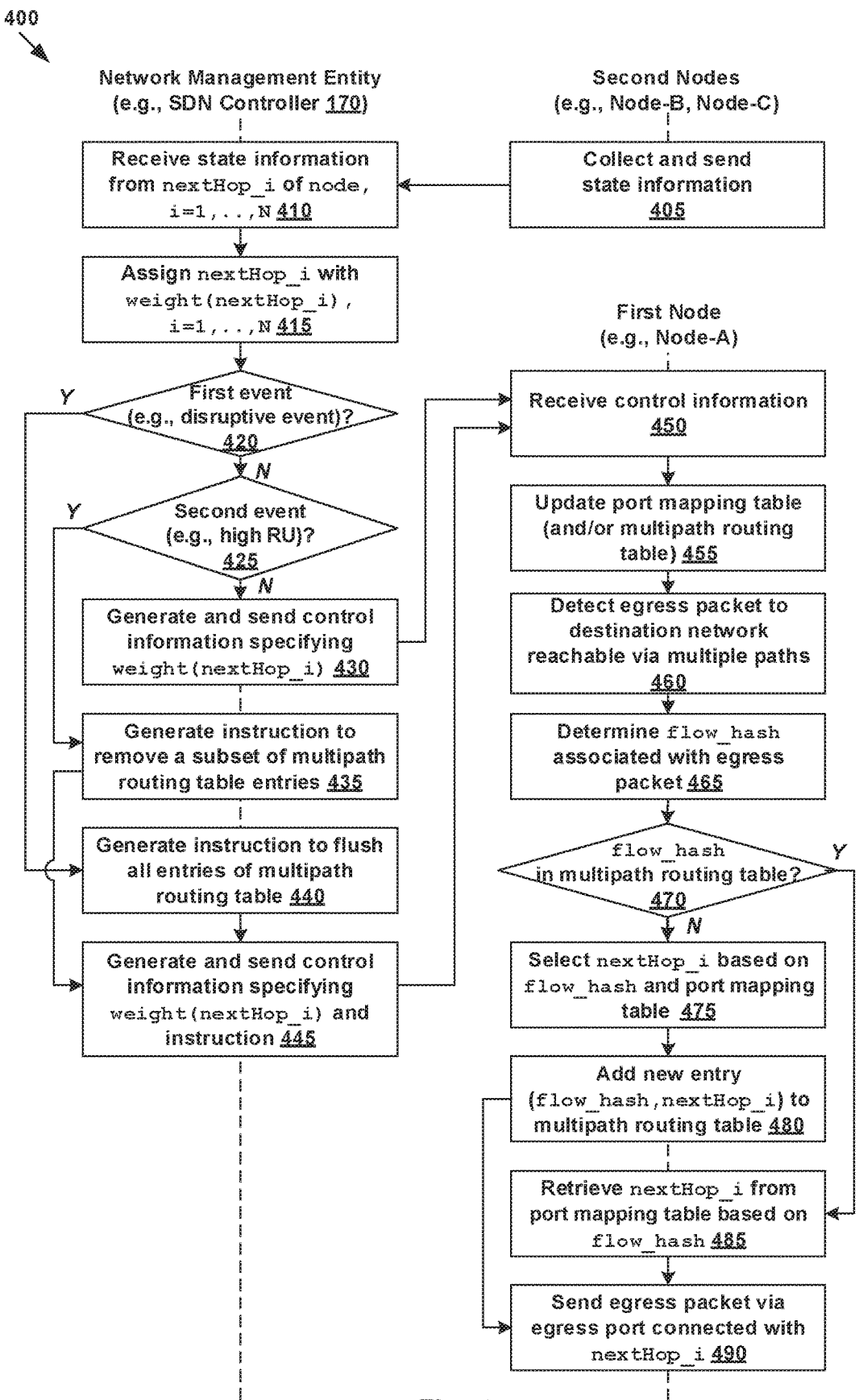
FIG. 4 is a flowchart of an example detailed process for weighted multipath routing configuration in an SDN environment.

FIG. 4 is a flowchart of example detailed process 400 for weighted multipath routing configuration in SDN environment 100. Example process 400 may include one or more operations, functions, or actions illustrated at 405 to 490. The various operations, functions or actions may be combined into fewer blocks, divided into additional blocks, and/or eliminated depending on the desired implementation.

At 405 in FIG. 4, each $i^{th}$ next-hop node (denoted as nextHop_i) collects state information associated with nextHop_i, where i=1, . . . , N and N is the total number next-hop nodes. For example in FIG. 1, there are N=2 next-hop nodes, i.e., node-B 120 (i=1) and node-C 130 (i=2), that provide multiple paths for node-A 110 to reach destination network=10.168.10.0/24. The state information (also known as event information) associated with nextHop_i may indicate the reliability of a path to the destination network via nextHop_i.

The state information may include any suitable information, such as bandwidth information associated with an egress interface of nextHop_i, resource utilization information associated with nextHop_i, packet performance information associated with the egress interface, routing information maintained by nextHop_i, etc. For example, bandwidth information may specify a bandwidth or capacity of an egress interface of nextHop_i that is (directly or indirectly) connected to the destination network. Resource utilization information may be CPU usage and/or memory usage, etc. In practice, resource utilization information may be associated with physical resource(s) of a physical host supporting nextHop_i and/or virtual resource(s) assigned to a virtualized computing instance supporting nextHop_i. Packet performance information may include any suitable performance (or congestion) indicators, such as packet loss, delay, jitter, latency, or any combination thereof, etc. In practice, the state information may also include an occurrence factor of any suitable user-defined event(s), such as interface flapping at nextHop_i, etc.

Depending on the desired implementation in practice, nextHop_i may collect and report different types of state information at different time intervals. For example, resource utilization information (e.g., CPU and memory utilization) may be reported every two seconds. In another example, packet loss (e.g., percentage of packets dropped or lost with respect to packets sent) may be reported more often (e.g., every one second) because it generally has more impact on path reliability.

At 405 in FIG. 4, nextHop_i further sends the state information to SDN controller 170. For example in FIG. 2, if nextHop_i=node-B 120 is an SR implemented by VM3 233 on host-B 210B, VM3 233 may send the state information to SDN controller 170 via control-plane channel 202 connecting host-B 210B and SDN controller 170. In another example, if nextHop_i=node-B 120 is a DR implemented by hypervisor-B 214B using forwarding table 216B, hypervisor-B 214B (e.g., using LCP agent 219B) may send the state information to SDN controller 170 via control-plane channel 202.

Similarly, if nextHop_i=node-C 130 is an SR implemented by VM5 235 on host-C 210C, VM5 235 may send the state information to SDN controller 170 via control-plane channel 203 connecting host-C 210C and SDN controller 170. In another example, if nextHop_i=node-C 130 is a DR implemented by hypervisor-C 214C using forwarding table 216C, hypervisor-C 214C (e.g., using LCP agent 219C) may send the state information to SDN controller 170 via control-plane channel 203.

Weights and Sub-Weights

At 410 and 415 in FIG. 4, in response to receiving state information from N next-hop nodes, SDN controller 170 assigns each nextHop_i with a weight denoted as weight (nextHop_i). Some examples of how block 415 may be performed are shown in FIG. 5, which is a schematic diagram illustrating example assignment 500 of weights and sub-weights in SDN environment 100.

Figure 5:
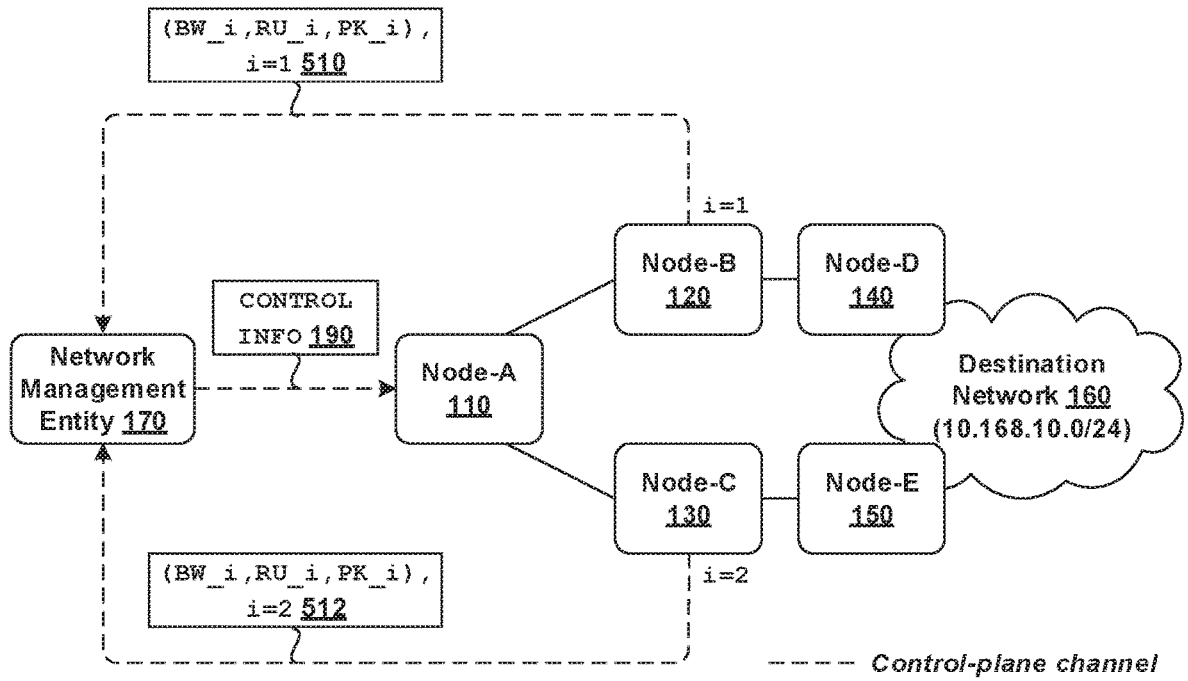
FIG. 5 is a schematic diagram illustrating example assignment of weights and sub-weights in an SDN environment.

Referring to 510 and 512 in FIG. 5, the state information from each nextHop_i may be denoted as (BW_i, RU_i, PK_i). In particular, BW_i may represent the bandwidth associated with an egress interface of nextHop_i to reach destination network=10.168.10.0/24. RU_i may represent resource utilization information in the form of an occurrence factor, which measures the historic occurrence of undesirable events that adversely affects the reliability of nextHop_i. PK_i may represent the packet loss associated with nextHop_i, such as 1/100 of the packet loss percentage of the egress interface connected with destination network=10.168.10.0/24.

For example, RU_i may measure the number of times CPU and/or memory utilization at nextHop_i exceeds a predetermined threshold (e.g., 90%). Depending on the desired implementation, RU_i may have a minimum value (e.g., 0) and incremented by a predetermined step size (e.g., OF_step=0.2) every time the predetermined threshold is exceeded, up until a maximum value (e.g., 1). Similarly, PK_i may have a minimum value (e.g., 0) that is incremented every time a predetermined threshold is exceeded, up until a maximum value (e.g., 1)

Referring to 520, 530 and 540 in FIG. 5, SDN controller 170 may determine sub-weights (weight_BW_i, weight_RU_i, weight_PK_i) associated with respective bandwidth, resource utilization information and packet performance information. In particular, at 520, weight_BW_i may denote a first sub-weight that is computed based on BW_i at nextHop_i, total egress bandwidth of all next-hop nodes (i.e., $\Sigma^{N}_{j=1}BW\_j$) and BW_factor. At 530, weight_RU_i may denote a second sub-weight that is computed based on (1-RU_i) and RU_factor. At 540, weight_PK_i may denote a third sub-weight that is computed based on (1-PK_i) and PK_factor.

In practice, (BW_factor, RU_factor, PK_factor) may be configurable by a user (e.g., network administrator) to determine the relative impact of respective (BW_i, RU_i, PK_i) on the resulting weight(nextHop_i). In the example in FIG. 5, BW_factor=5, RU_factor=2 and PK_factor=3 may be configured to give more consideration to the bandwidth information, followed by packet performance and resource utilization. The programmability of these factors, as well as OF_step based on which RU_i is incremented, provide the user with greater control of weighted multipath routing.

Referring to 550 in FIG. 5, weight(nextHop_i) associated with nextHop_i may be computed as a function $f$ of (weight_BW_i, weight_RU_i, weight_PL_i). In practice, any suitable function $f$ may be used, such as a summation function in FIG. 5 as follows:

weight(nextHop_$i$)=ROUND(weight_$BW\_i$+weight_$RU\_i$+weight_$PL\_i$).

ROUND( ) may be used for rounding the resulting weight to the nearest value (e.g., round up, round down, etc.). Parameters and/or computational approaches 520-550 for calculating sub-weights (weight_BW_i, weight_RU_i, weight_PK_i) and weight(nextHop_i) for i=1, . . . , N may be user-configurable to provide users with a greater control over the implementation of weighted multipath routing at node-A 110. Depending on the desired implementation, any additional and/or alternative computational approaches, weights and factors than that shown in FIG. 5 may be used in practice.

Event Detection

Referring to FIG. 4 again, at 420 to 445, SDN controller 170 further performs event detection based on the state information and/or weight(nextHop_i) to detect whether an event associated with a particular nextHop_i, or multiple next-hop nodes, has occurred. For example, events may be categorized as "disruptive" and "non-disruptive" based on any suitable criterion or criteria. For example, the first event at block 420 may be a disruptive event that will affect all ongoing packet flows being forwarded by node-A 110. The second event at block 425 may be a non-disruptive event that will affect ongoing packet flow(s) being forwarded by node-A 110 via a particular nextHop_i, such as high resource utilization at nextHop_i that may adversely impact path reliability. In practice, it should be noted that high resource utilization may or may not lead to packet loss, which may be (additionally or alternatively) caused by factor(s) such as configuration error, interface flapping, physical network disconnection, etc. To improve flexibility and programmability, the "first event" block 410 and "second event" at block 420 may be detected based on user-configurable criterion or criteria.

Three scenarios may occur based on the detection at 420 and 425. In a first scenario, if the first event and second event are not detected, block 430 will be performed to send control information specifying weight(nextHop_i) to node-A 110. In a second scenario, in response to detecting the second event (but not the first event), blocks 435 and 445 will be performed to send control information to node-A 110. The control information includes an instruction to remove a subset of entries in a multipath routing table (to be explained further below) maintained by node-A 110. In a third scenario, in response to detecting a first event, blocks 440 and 445 will be performed to send control information to node-A 110 as well as an instruction to flush or remove all entries of the multipath routing table. These three scenarios will be discussed further below using FIG. 6A, FIG. 6B and FIG. 7.

In practice, the "sending" step at blocks 430 and 445 may be performed based on the type of node-A 110, such as DR or SR. For example, in the case of a DR, SDN controller 170 may send the control information to node-A 110A and hypervisor-A 214A supporting node-A 110, which may be represented as an entry in forwarding table 216A in FIG. 2. Node-A 110 may also span multiple hosts, to which case the control information will be sent. In the case of an SR, SDN controller 170 may send the control information to node-A 110, which may be a virtualized computing instance (e.g., virtual machine, container, etc.) supported by host-A 210A in FIG. 2.

(a) First Scenario (Related to 430)

In this scenario, SDN controller 170 sends control information to cause node-A 110 to perform weighted multipath routing based on weight(nextHop_i). Referring to FIG. 4 again, at 450 and 455, in response to receiving the control information, node-A 110 configures a port mapping table according to each weight(nextHop_i). An example is shown in FIG. 6A, which is a schematic diagram illustrating first example weighted multipath routing 600 based on control information from a network management entity.

Figure 6A:
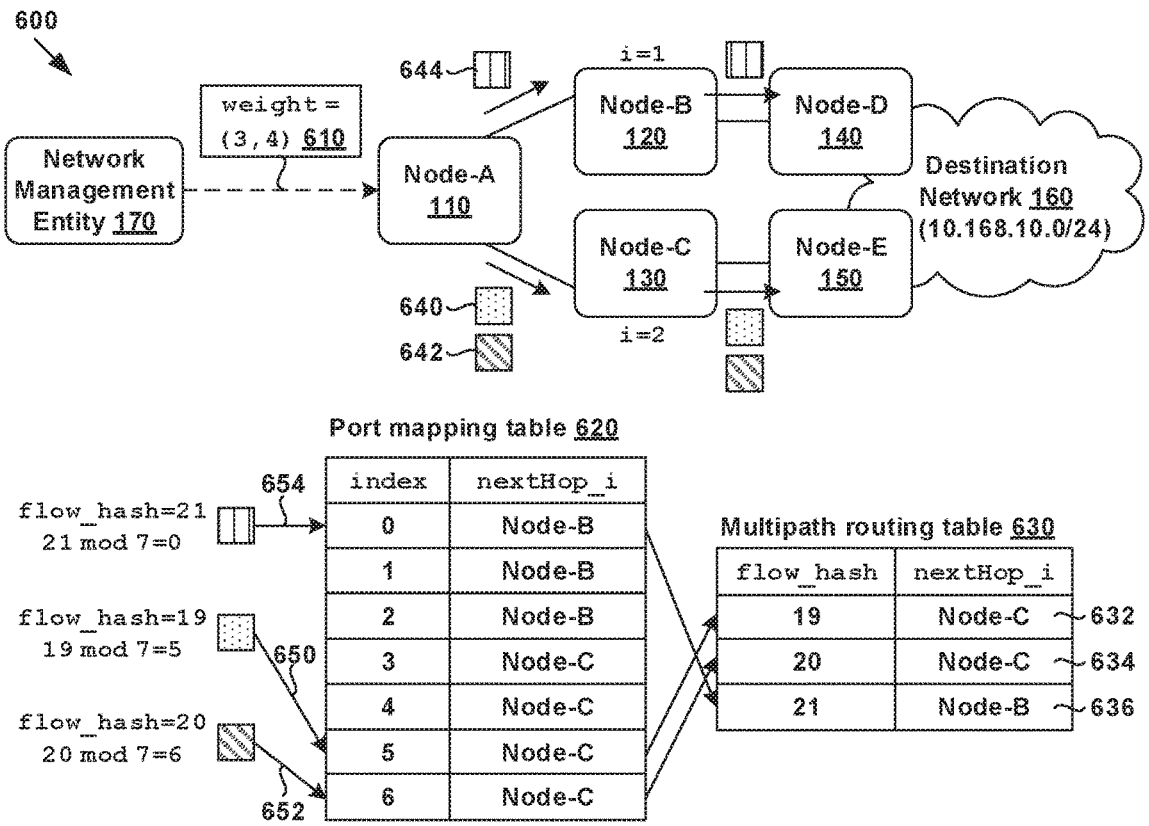
FIG. 6A is a schematic diagram illustrating a first example weighted multipath routing based on control information from a network management entity.

In the example in FIG. 6A, control information 610 received from SDN controller 170 specifies weight(node-B)=3 and weight(node-C)=4 associated with respective next-hop node-B 120 and node-C 130. As such, port mapping table 620 is configured to include weight(node-B)=3 entries (see indices 0-2) that are mapped to node-B 120. Port mapping table 620 is further configured to include weight (node-C)=4 entries (see indices 3-6) that are mapped to node-C 130. This way, node-A 110 may select an egress interface that connects with node-B 120 or node-C 130 to reach a destination located in network 10.168.10.0/24. As will be explained further below, node-A 110 also maintains multipath routing table 630 that stores mapping information that associates each ongoing packet flow being forwarded by node-A 110 with a next-hop node selected for the ongoing packet flow.

Weighted multipath routing may then be performed by node-A 110 based on port mapping table 620 and multipath routing table 630. In particular, at 460 and 465 in FIG. 4, in response to detecting an egress packet that is reachable via multiple paths provided by respective next-hop node-B 120 and node-C 130, node-A 110 determines a flow hash value (denoted as flow_hash) associated with the egress packet. In practice, block 460 may involve node-A 110 parsing header information of the egress packet to determine whether its destination IP address is in network=10.168.10.0/24 reachable via node-B 120 and node-C 130. Block 465 may involve determining flow_hash based on packet flow tuples, such as source IP address, destination IP address, source MAC address, destination MAC address, protocol, or any combination thereof.

At 470, 475 and 480 in FIG. 4, in response to determination that multipath routing table 630 does not include an entry matching flow_hash associated with the egress packet, node-A 110 selects a particular nextHop_i for forwarding the egress packet to its destination and updates multipath routing table 630 accordingly. For example, assuming multipath routing table 630 is empty, a first entry (see 632) may be created in response to detecting a first egress packet from a first packet flow (see 640) that is destined for 10.168.10.0/24. First entry 632 in multipath routing table 630 associates flow_hash=19 calculated based on first egress packet 640 with nextHop_i=node-C 130 selected for forwarding first egress packet 640. As shown at 650 in FIG. 6A, since port mapping table 620 has a total of seven (7) entries, the selection of nextHop_i=node-C 130 may be performed by calculating flow_hash mod 7=19 mod 7=5, and mapping the result to index=5 associated with node-C 130 in port mapping table 620.

At 490 in FIG. 4, first egress packet 640 is sent via an egress interface of node-A 110 that is connected to node-C 130, which then forwards first egress packet 640 to node-E 150 and subsequently destination network=10.168.10.0/24. Based on first entry 632 in multipath routing table 630, any subsequent egress packet from the same packet flow will be sent via the next-hop node-C 130. In particular, at 470, 485 and 490 in FIG. 4, in response to detecting a subsequent egress packet associated flow_hash=19, the subsequent egress packet will be forwarded via node-C 130 associated with flow_hash=19 in multipath routing table 630.

For a different packet flow, another entry may be created in multipath routing table 630 to store an association between flow_hash for the packet flow and nextHop_i selected for the packet flow. For example, second entry 634 stores an association between flow_hash=20 and nextHop_i=node-C 130 selected for a subsequent egress packet belonging to a second packet flow (see 642). As shown at 652 in FIG. 6A, the selection of nextHop_i=node-C 130 may involve calculating flow_hash mod 7=20 mod 7=6, and mapping the result to index=6 associated with node-C 130 in port mapping table 620.

In another example, third entry 636 stores an association between flow_hash=21 and nextHop_i=node-B 120 selected for a subsequent egress packet belonging to a third packet flow (see 644). As shown at 654 in FIG. 6A, the selection of nextHop_i=node-B 120 may involve calculating flow_hash mod 7=21 mod 7=0, and mapping the result to index=0 associated with node-B 120 in port mapping table 620. As such, as a new packet flow is detected, the nextHop_i selected based on port mapping table 620 may be stored in multipath routing table 630, which facilitates fast access and forwarding for subsequent packets belonging to the same packet flow.

(b) Second Scenario (Related to 435 and 445)

In another scenario, SDN controller 170 may generate and send control information specifying weight(nextHop_i) and an instruction to update multipath routing table 630. The instruction may be generated and sent according to blocks 435 and 445 in FIG. 4 in response to SDN controller 170 detecting a "second event" based on state information from node-B 120 and node-C 130 and/or weight(nextHop_i). One example is when a particular nextHop_i, where i∈{1, ..., N}, is detected to have high resource utilization, such as when RU_i=1 and weight_RU_i=0 (see 530 in FIG. 5). In another example, the second event may be configured based on any suitable user preference to divert some existing flows over a particular next-hop node. One reason for such diversion may be pricing or Service Level Agreement (SLA) offered by a service provider hosting node-D 140 and/or node-E 150, etc.

Figure 6B:
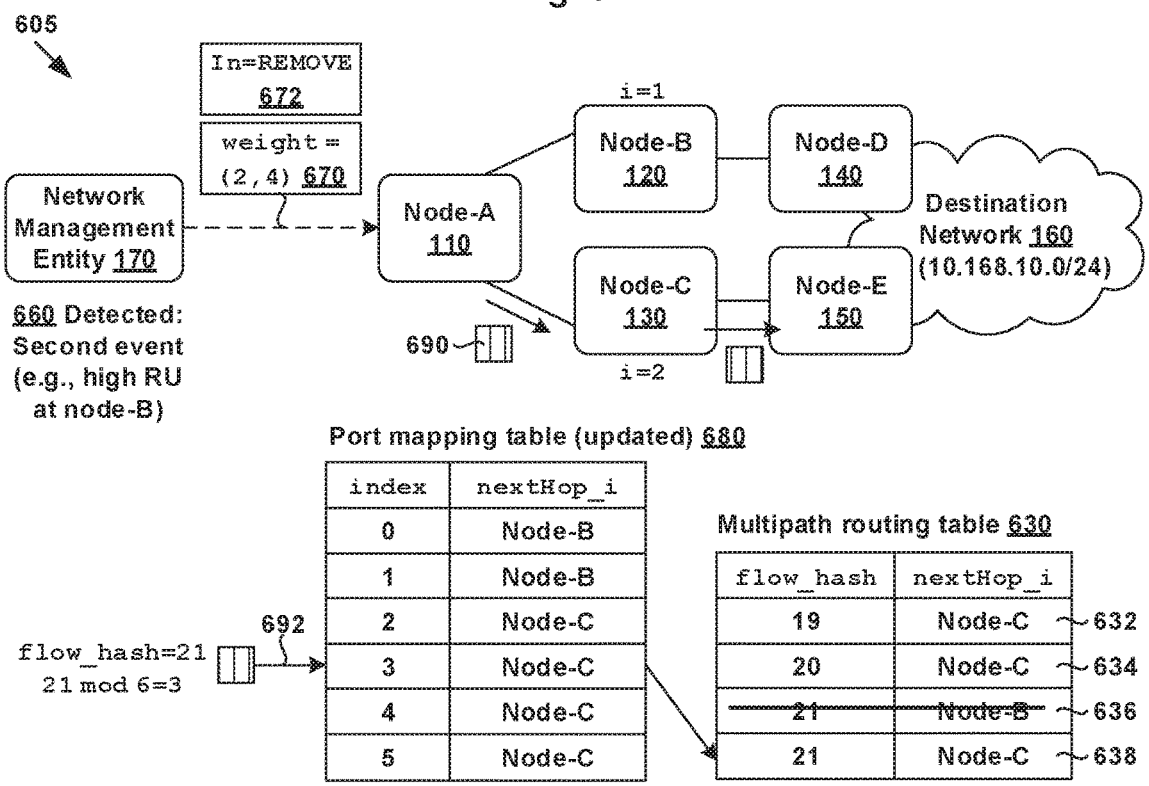
FIG. 6B is a schematic diagram illustrating a second example weighted multipath routing based on control information from a network management entity.

FIG. 6B is a schematic diagram illustrating a second example weighted multipath routing 605 based on control information from a network management entity. As shown at 660 in FIG. 6B, consider the case where SDN controller 170 detects that weight_RU_i=0 for nextHop_i=node-B 120. In response to receiving control information specifying weight (nextHop_i) (see 670) and an instruction (see 672) from SDN controller 170, node-A 110 proceeds to remove one entry (see 636) associated with node-B 120 from multipath routing table 630. This affects the corresponding packet flow with flow_hash=21, but not other ongoing flows (see 632-634). Since weight_RU_i=0, control information 670 may specify a reduced weight(nextHop_i)=ROUND (weight_BW_i+0+weight_PK_i) for node-B 120 according to FIG. 5.

Based on control information 670, node-A 110 generates updated port mapping table 680 with weight(node-B)=2 entries (see indices 0-1) mapped to node-B 120 (see indicates 2-6) and weight(node-C)=4 entries (see indices 2-5) mapped to node-C 130. In response to receiving a subsequent egress packet (see 690) with the same flow_hash=21, node-C 130 may be selected by calculating flow_hash mod 6=21 mod 6=3, and mapping the result to index=3 associated with node-C 130 in port mapping table 620 (see also 692). Multipath routing table 630 is also updated with a new entry (see 638) associating flow_hash=21 with node-C 130. Entries 632, 634 will be unaffected to minimize disruption to other ongoing packet flows. See corresponding blocks 460, 465, 475, 480 and 490 in FIG. 4.

(c) Third Scenario (Related to 440 and 445)

Figure 7:
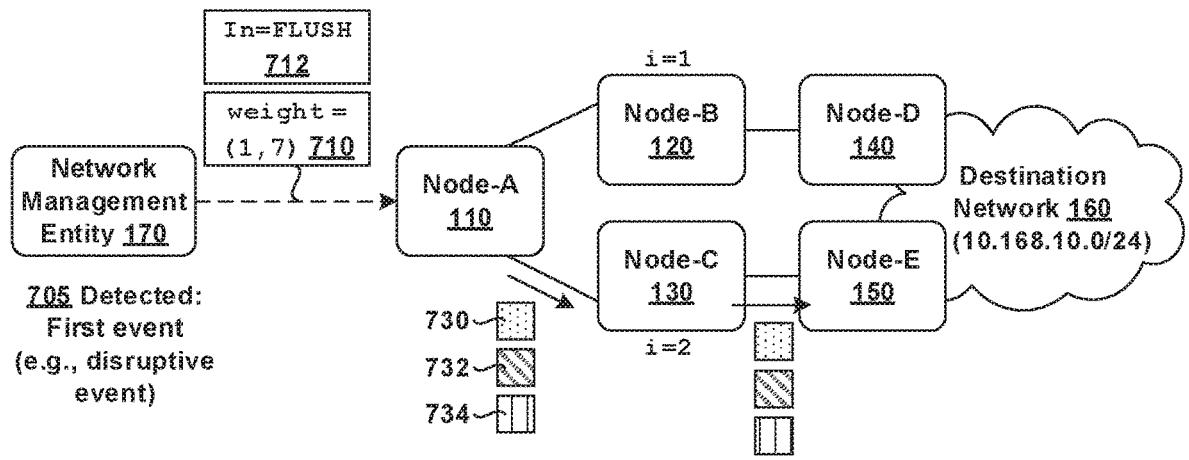
FIG. 7 is a schematic diagram illustrating a third example weighted multipath routing based on control information from a network management entity.

FIG. 7 is a schematic diagram illustrating third example weighted multipath routing 700 based on control information from a network management entity. As shown at 705 in FIG. 7, SDN controller 170 detects a first event in the form of a disruptive event according to block 420 in FIG. 4. For example, a disruptive event may be detected when a particular path or link via nextHop_i is down, such as based on state information that includes routing information maintained by nextHop_i, etc. In practice, when a particular path to destination network 160 goes down, nextHop_i may update its routing information to exclude the path (e.g., remove routing entry or entries), and send the updated routing information to SDN controller 170. This way, SDN controller 170 may detect that the particular path via nextHop_i is down based on the updated routing information.

In another example, a disruptive event may be detected based on weight fluctuation associated with weight_i (nextHop_i). For example, weight_i(nextHop_i) at the current time t1 may have fluctuated by a predetermined threshold (e.g., increase or decrease by 50%) compared to weight_i(nextHop_i) a previous time t0<t1. In a further example, a disruptive event may be detected when weight_PK_i meets a predetermined threshold (e.g., weight_PK_i=0), which occurs when a high packet loss is reported by nextHop_i.

In response to detecting a disruptive event, SDN controller 170 sends control information specifying weight_i (nextHop_i) (see 710) and an instruction (see 712) to flush or reset in multipath routing table 630. The instruction causes node-A 110 to remove all entries 632-636 from multipath routing table 630, thereby disrupting all ongoing packet flows. Compared to weight(node-B)=3 and weight (node-C)=4 in FIG. 6A, updated weight(node-B)=1 and weight(node-C)=7 in FIG. 7 change by more than 50% (−71% and +53% respectively). Based on control information 710 specifying the updated weights, node-A 110 generates updated port mapping table 720 according to 455 in FIG. 4. In particular, weight(node-B)=1 entry (see index 0) is mapped to node-B 120, and weight(node-C)=7 entries (see indices 1-7) are mapped to node-C 130. Based on updated port mapping table 690 and multipath routing table 630 (now empty), nextHop_i is selected for subsequent egress packets.

For example, in response to detecting a first egress packet from a first packet flow (see 730) that is destined for 10.168.10.0/24, a first entry (see 740) may be created in multipath routing table 630. First entry 740 associates flow_hash=19 calculated based on first egress packet 730 with nextHop_i=node-C 130 selected for forwarding first egress packet 730. Since port mapping table 620 now has a total of eight (8) entries, the selection of nextHop_i=node-C 130 may involve calculating flow_hash mod 8=19 mod 8=3 (see 750), and mapping the result to index=3 associated with node-C 130 in updated port mapping table 720.

In another example, in response to detecting a second egress packet from a second packet flow (see 732) that is destined for 10.168.10.0/24, a second entry (see 742) may be created in multipath routing table 630. As shown at 752 in FIG. 7, the selection of nextHop_i=node-C 130 may involve calculating flow_hash mod 8=20 mod 8=4, and mapping the result to index=4 in port mapping table 620. In a further example, in response to detecting a third egress packet from a third packet flow (see 734) that is destined for 10.168.10.0/24, a third entry (see 744) may be created in multipath routing table 630. As shown at 754 in FIG. 7, the selection of nextHop_i=node-C 130 may involve calculating flow_hash mod 8=21 mod 8=5, and mapping the result to index=5 in port mapping table 620.

According to examples of the present disclosure, SDN controller 170 may update weight(nextHop_i) for each nextHop_i dynamically based on state information received from nextHop_i. This in turn allows node-A 110 to adjust distribution of egress traffic over node-B 120 and node-C 130 dynamically. Further, through event detection at blocks 420 and 425, events that affect all ongoing packet flows (e.g., disruptive event detected) or only ongoing packet flow(s) associated with a particular nextHop_i may be detected. When weights are updated by SDN controller 170, existing or ongoing packet flows being forwarded by node-A 110 are generally unaffected, unless SDN controller 170 detects the first event is detected at block 420 or second event at 425 and sends an instruction to node-A 110 to remove all or a subset of the entries in multipath routing table 630.

Figure 8:
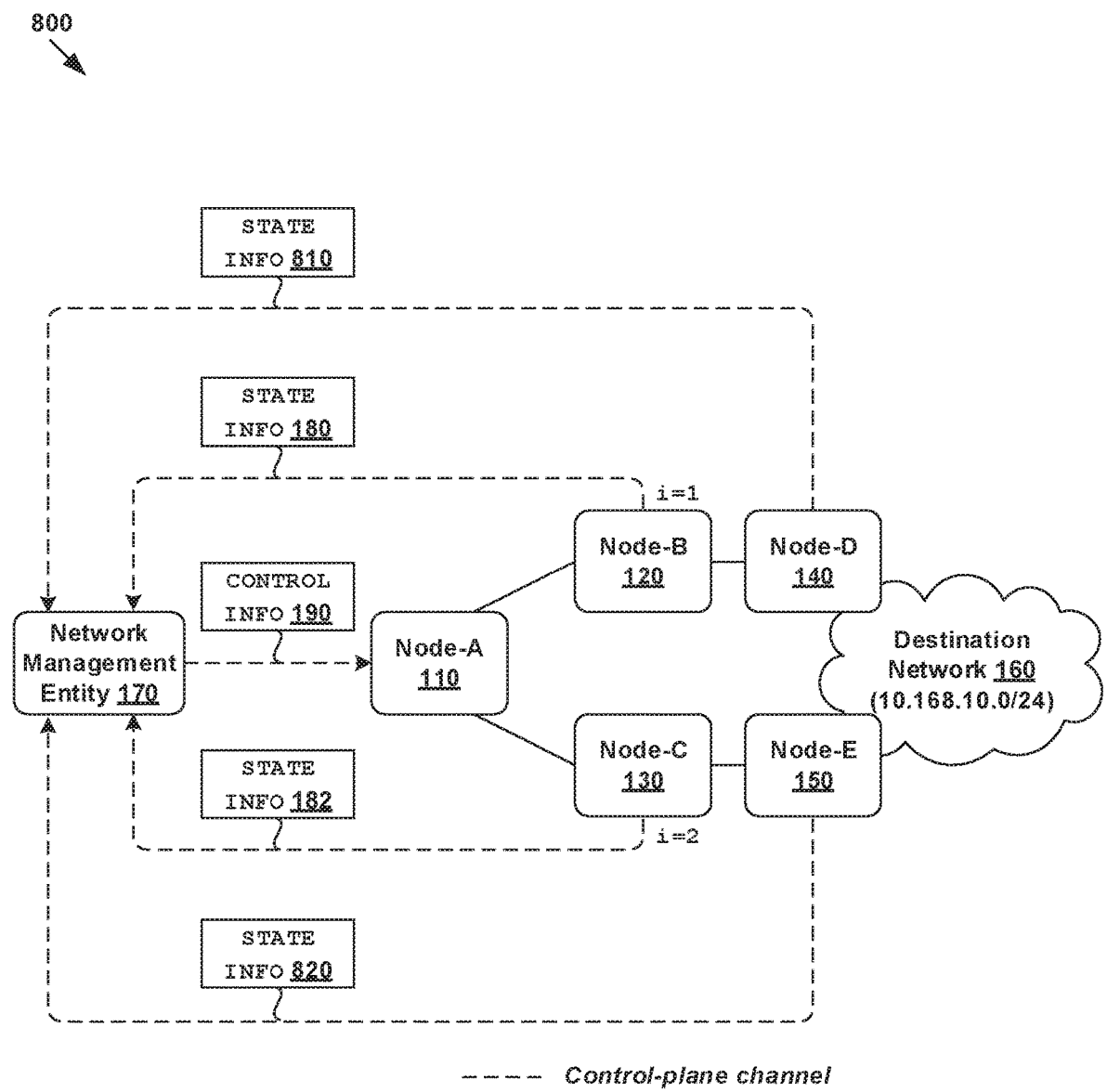
FIG. 8 is a schematic diagram illustrating another example of weighted multipath routing configuration in the example SDN environment in FIG. 1.

According to the examples in FIG. 1 to FIG. 7, SDN controller 170 may rely on state information from next-hop node-B 120 and node-C 130 to perform weighted multipath routing configuration. In practice, if node-D 140 and node-E 150 are under the management of SDN controller 170, they may also send state information to SDN controller 170. In more detail, FIG. 8 is a schematic diagram illustrating another example 800 of weighted multipath routing configuration in example SDN environment 100 in FIG. 1. In this example, SDN controller 170 receives state information from "second nodes" in the form of node-B 120 (see 180) and node-C 130 (see 182) and "third nodes" in the form of node-D 140 (see 810) and node-E 150 (see 820).

Based on state information 180-182 and 810-820, SDN controller 170 assigns weight(node-B) and weight(node-C). For example, since node-B 120 and node-D 140 are nodes along a first path to destination network=10.168.10.0/24, weight(node-B) may be assigned based on state information 180, 810 from node-B 120 and node-D 140. Similarly, since node-C 130 and node-E 150 are nodes along a second path to the destination network, weight(node-C) may be assigned based on state information 182/820 from node-C 130 and node-E 150. This way, the reliability of multiple nodes along a path to the destination network may be considered.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 8. For example, computer system(s) capable of supporting SDN controller 170 and nodes 110-150 may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

What is claimed is:

1. A method for a network manager to perform weighted multipath routing configuration in a software-defined networking (SDN) environment that includes the network manager, a first node, and multiple next-hop second nodes, the method comprising:

obtaining, by the network manager from the multiple next-hop second nodes, state information associated with the multiple next-hop second nodes, wherein the multiple next-hop second nodes each provide a next hop from the first node in multiple respective paths for an egress packet that is destined from the first node to a destination network;

based on the state information associated with the multiple next-hop second nodes, assigning, by the network manager, the multiple next-hop second nodes with respective multiple weights, wherein:

the state information represents a plurality of performance-related parameters that respectively correspond to a plurality of sub-weights, each particular weight of the multiple weights is computed based on the plurality of sub-weights, and a value of at least one sub-weight of the plurality of sub-weights is configurable to provide more consideration to the at least one sub-weight in computing the particular weight, relative to other sub-weights of the plurality of sub-weights; and generating and sending, by the network manager, control information that specifies the multiple weights to the first node to cause the first node to select, based on the multiple weights, a particular next-hop second node from amongst the multiple next-hop second nodes as the next hop to receive the egress packet from the first node.

2. The method of claim 1, wherein obtaining the state information comprises:

receiving, via a control-plane channel that connects the network manager with the particular next-hop second node, state information that represents the plurality of performance-related parameters which include one or more of: bandwidth information associated with an egress interface of the particular next-hop second node, resource utilization information associated with the particular next-hop second node, packet performance information associated with the egress interface, and routing information maintained by the particular next-hop second node.

3. The method of claim 2, wherein assigning the multiple next-hop second nodes with the respective multiple weights comprises:

based on the state information, determining the plurality of sub-weights which include: a first sub-weight associated with the bandwidth information, a second sub-weight associated with the resource utilization information, and a third sub-weight associated with the packet performance information; and assigning the particular next-hop second node with the particular weight by summing the first sub-weight, second sub-weight, and third sub-weight to compute the particular weight.

4. The method of claim 1, wherein generating the control information further comprises:

generating the control information to include an instruction to cause the first node to update a multipath routing table maintained by the first node, wherein the multipath routing table includes multiple entries that each associate (a) an ongoing flow of one or more egress packets with (b) one of the multiple next-hop second nodes via which the ongoing flow is forwarded by the first node to the destination network.

5. The method of claim 4, wherein generating the control information further comprises:

in response to detecting a first event based on the state information, or multiple weights, or both, generating the instruction to cause the first node to remove all of the multiple entries from the multipath routing table.

6. The method of claim 4, wherein generating the control information further comprises:

in response to detecting a second event based on the state information, or multiple weights, or both, generating the instruction to cause the first node to remove a subset of the multiple entries from the multipath routing table, wherein the subset is associated with one of the multiple next-hop second nodes.

7. The method of claim 1, wherein sending the control information comprises one of:

in response to determining that the first node is a distributed logical router, sending the control information to a hypervisor of a physical host that supports the first node; and in response to determining that the first node is a centralized logical router, sending the control information to a virtualized computing instance that supports the first node.

8. A non-transitory computer-readable storage medium that includes a set of instructions which, in response to execution by a processor of a network manager of a computer system, cause the processor to perform a method of weighted multipath routing configuration in a software-defined networking (SDN) environment that includes the computer system, a first node, and multiple next-hop second nodes, wherein the method comprises:

obtaining, by the network manager from the multiple next-hop second nodes, state information associated with the multiple next-hop second nodes, wherein the multiple next-hop second nodes each provide a next hop from the first node in multiple respective paths for an egress packet that is destined from the first node to a destination network;

based on the state information associated with the multiple next-hop second nodes, assigning, by the network manager, the multiple next-hop second nodes with respective multiple weights, wherein:
the state information represents a plurality of performance-related parameters that respectively correspond to a plurality of sub-weights,
each particular weight of the multiple weights is computed based on the plurality of sub-weights, and
a value of at least one sub-weight of the plurality of sub-weights is configurable to provide more consideration to the at least one sub-weight in computing the particular weight, relative to other sub-weights of the plurality of sub-weights; and
generating and sending, by the network manager, control information that specifies the multiple weights to the first node to cause the first node to select, based on the multiple weights, a particular next-hop second node from amongst the multiple next-hop second nodes as the next hop to receive the egress packet from the first node.

9. The non-transitory computer-readable storage medium of claim 8, wherein obtaining the state information comprises:
receiving, via a control-plane channel that connects the network manager of the computer system with the particular next-hop second node, state information that represents the plurality of performance-related parameters which include one or more of: bandwidth information associated with an egress interface of the particular next-hop second node, resource utilization information associated with the particular next-hop second node, packet performance information associated with the egress interface, and routing information maintained by the particular next-hop second node.

10. The non-transitory computer-readable storage medium of claim 9, wherein assigning the multiple next-hop second nodes with the respective multiple weights comprises:
based on the state information, determining the plurality of sub-weights which include: a first sub-weight associated with the bandwidth information, a second sub-weight associated with the resource utilization information, and a third sub-weight associated with the packet performance information; and
assigning the particular next-hop second node with the particular weight by summing the first sub-weight, second sub-weight, and third sub-weight to compute the particular weight.

11. The non-transitory computer-readable storage medium of claim 8, wherein generating the control information further comprises:
generating the control information to include an instruction to cause the first node to update a multipath routing table maintained by the first node, wherein the multipath routing table includes multiple entries that each associate (a) an ongoing flow of one or more egress packets with (b) one of the multiple next-hop second nodes via which the ongoing flow is forwarded by the first node to the destination network.

12. The non-transitory computer-readable storage medium of claim 11, wherein generating the control information further comprises:
in response to detecting a first event based on the state information, or multiple weights, or both, generating the instruction to cause the first node to remove all of the multiple entries from the multipath routing table.

13. The non-transitory computer-readable storage medium of claim 11, wherein generating the control information further comprises:
in response to detecting a second event based on the state information, or multiple weights, or both, generating the instruction to cause the first node to remove a subset of the multiple entries from the multipath routing table, wherein the subset is associated with one of the multiple next-hop second nodes.

14. The non-transitory computer-readable storage medium of claim 8, wherein sending the control information comprises one of:
in response to determining that the first node is a distributed logical router, sending the control information to a hypervisor of a physical host that supports the first node; and
in response to determining that the first node is a centralized logical router, sending the control information to a virtualized computing instance that supports the first node.

15. A computer system configured to perform weighted multipath routing configuration in a software-defined networking (SDN) environment that includes the computer system, a first node, and multiple next-hop second nodes, the computer system comprising:
a processor of a network manager; and
a non-transitory computer-readable medium having stored thereon instructions that, in response to execution by the processor, cause the processor to:
obtain, by the network manager from the multiple next-hop second nodes, state information associated with the multiple next-hop second nodes, wherein the multiple next-hop second nodes each provide a next hop from the first node in multiple respective paths for an egress packet that is destined from the first node to a destination network;
based on the state information associated with the multiple next-hop second nodes, assign, by the network manager, the multiple next-hop second nodes with respective multiple weights, wherein:
the state information represents a plurality of performance-related parameters that respectively correspond to a plurality of sub-weights,
each particular weight of the multiple weights is computed based on the plurality of sub-weights, and
a value of at least one sub-weight of the plurality of sub-weights is configurable to provide more consideration to the at least one sub-weight in computing the particular weight, relative to other sub-weights of the plurality of sub-weights; and
generate and send, by the network manager, control information that specifies the multiple weights to the first node to cause the first node to select, based on the multiple weights, a particular next-hop second node from amongst the multiple next-hop second nodes as the next hop to receive the egress packet from the first node.

16. The computer system of claim 15, wherein the instructions to cause the processor to obtain the state information cause the processor to:
receive, via a control-plane channel that connects the network manager of the computing system with the particular next-hop second node, state information that represents the plurality of performance-related parameters which include one or more of: bandwidth information associated with an egress interface of the particular next-hop second node, resource utilization information associated with the particular next-hop second node, packet performance information associated with the egress interface, and routing information maintained by the particular next-hop second node.

17. The computer system of claim 16, wherein the instructions to cause the processor to assign the multiple second nodes with the respective multiple weights cause the processor to:
based on the state information, determine the plurality of sub-weights which include: a first sub-weight associated with the bandwidth information, a second sub-weight associated with the resource utilization information, and a third sub-weight associated with the packet performance information; and
assign the particular next-hop second node with the particular weight by summation of the first sub-weight, second sub-weight, and third sub-weight to compute the particular weight.

18. The computer system of claim 15, wherein the instructions to cause the processor to generate the control information further cause the processor to:
generate the control information to include an instruction to cause the first node to update a multipath routing table maintained by the first node, wherein the multipath routing table includes multiple entries that each associate (a) an ongoing flow of one or more egress packets with (b) one of the multiple next-hop second nodes via which the ongoing flow is forwarded by the first node to the destination network.

19. The computer system of claim 18, wherein the instructions to cause the processor to generate the control information cause the processor to:
in response to detecting a first event based on the state information, or multiple weights, or both, generate the instruction to cause the first node to remove all of the multiple entries from the multipath routing table.

20. The computer system of claim 18, wherein the instructions to cause the processor to generate the control information cause the processor to:
in response to detecting a second event based on the state information, or multiple weights, or both, generate the instruction to cause the first node to remove a subset of the multiple entries from the multipath routing table, wherein the subset is associated with one of the multiple next-hop second nodes.

21. The computer system of claim 15, wherein the instructions to cause the processor to send the control information cause the processor to perform one of:
in response to determination that the first node is a distributed logical router, send the control information to a hypervisor of a physical host that supports the first node; and
in response to determination that the first node is a centralized logical router, send the control information to a virtualized computing instance that supports the first node.

* * * * *